United States Patent [19]
Lodholz et al.

[11] 4,069,150
[45] Jan. 17, 1978

[54] CONTROL DEVICE FOR DUAL FLOW CLARIFIERS

[75] Inventors: John C. Lodholz, Perkasie; P. Barry Straus, Hatfield, both of Pa.

[73] Assignee: FMC Corporation, Chicago, Ill.

[21] Appl. No.: 731,747

[22] Filed: Oct. 12, 1976

[51] Int. Cl.² .......................................... B01C 21/24
[52] U.S. Cl. ................................... 210/112; 210/134; 210/528
[58] Field of Search .................. 210/87, 97, 103, 104, 210/112, 114, 523, 524, 525, 528, 530, 134, 135

[56] References Cited
U.S. PATENT DOCUMENTS

| 3,338,827 | 8/1967 | Mausolf | 210/523 X |
|---|---|---|---|
| 3,349,030 | 10/1967 | Savage | 210/523 X |
| 3,494,462 | 2/1970 | Baud | 210/112 |
| 3,800,955 | 4/1974 | Edgeaton | 210/528 |
| 3,807,560 | 4/1974 | Pentz et al. | 210/112 X |
| 3,857,788 | 12/1974 | Smith | 210/523 X |

Primary Examiner—John Adee
Attorney, Agent, or Firm—Dressler, Goldsmith, Clement, Gordon & Shore, Ltd.

[57] ABSTRACT

A sludge removal mechanism including concentrating members for concentrating the settled sludge in localized areas on the bottom of the tank with conduits leading from the localized areas to a collection zone. A flow control device is associated with each conduit in the collection zone and a plurality of flow control devices are simultaneously moved by a drive mechanism so that the range of flow from a plurality of localized areas in a tank are changed simultaneously.

15 Claims, 7 Drawing Figures

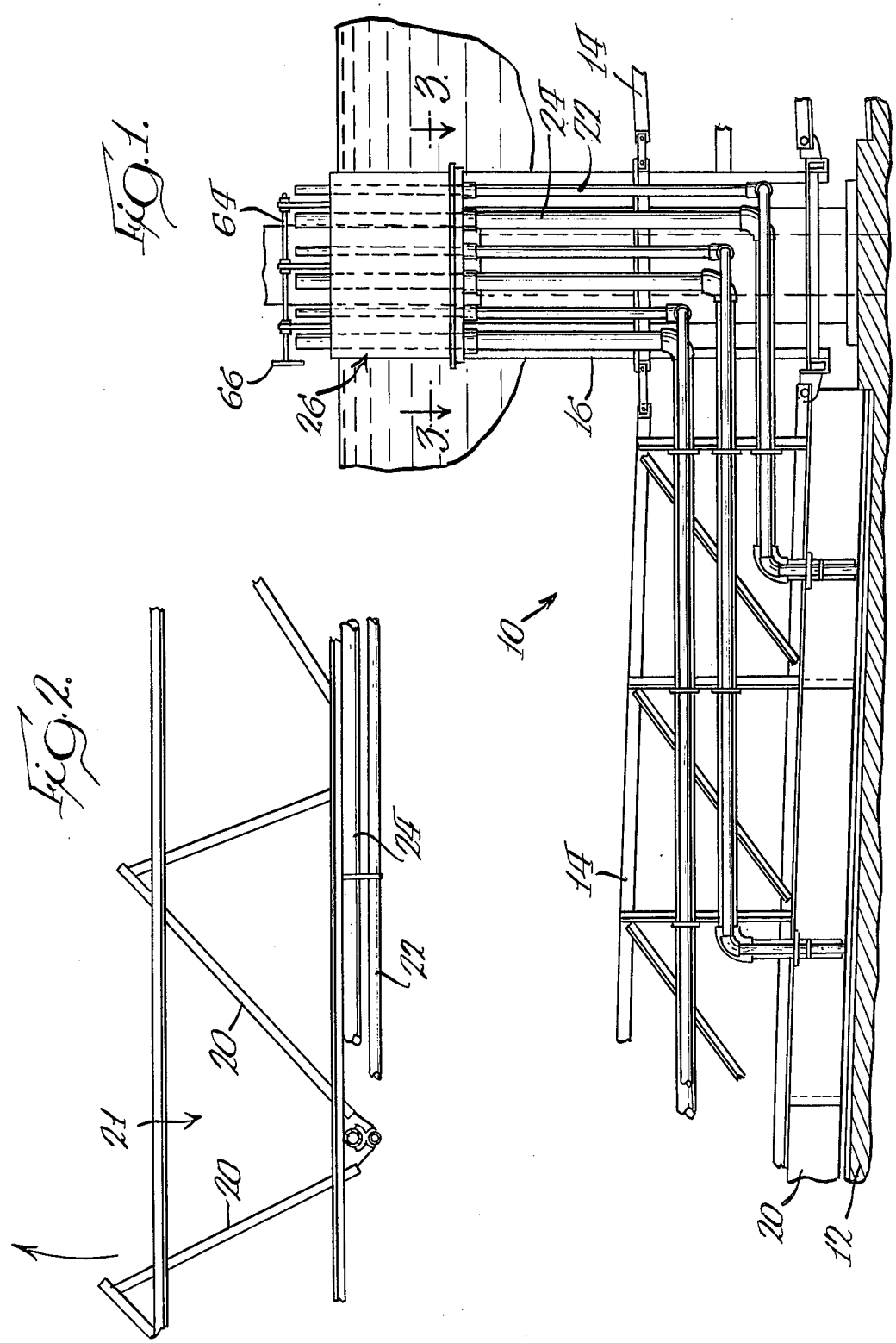

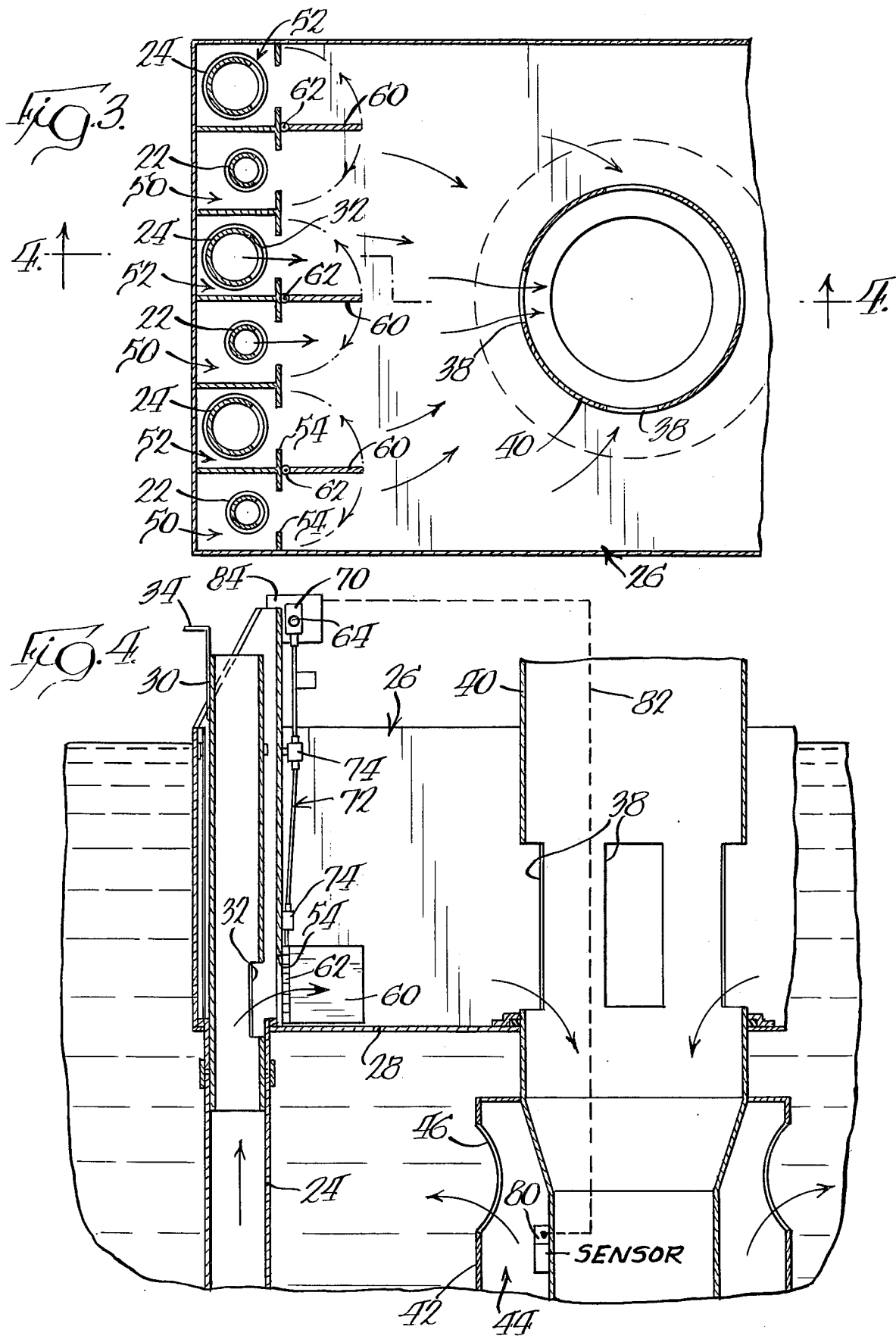

CONTROL DEVICE FOR DUAL FLOW CLARIFIERS

BACKGROUND OF THE INVENTION

The present invention relates to an improvement in a sludge withdrawal mechanism of the type disclosed in U.S. Pat. No. 3,800,955 assigned to the assignee of the present invention. The subject matter of that patent which is not inconsistent with the present disclosure is incorporated herein by reference.

The sludge withdrawal or removal mechanism disclosed in the above mentioned patent consists of a pair of rake arms that are rotated within a tank and the rake arms have V-shaped plows defined thereon so that the settled sludge is concentrated in localized areas on the tank bottom. A pair of conduits lead from each of the localized areas to a collection zone. By utilizing two different conduits of the same or different sizes, a first flow range can be developed utilizing only the first conduits, a second flow range can be developed by utilizing only the second conduits and a third flow range can be developed by utilizing both conduits.

SUMMARY OF THE INVENTION

According to the present invention, there is provided a system wherein the flow rate for the conduits associated with a rake arm of a sludge removal mechanism can be simultaneously changed which substantially decreases the time required by the operator to change the flow rate for an entire plant.

More specifically, in one embodiment, pivoted plates are utilized for controlling the flow through a pair of conduits that withdraw sludge from a localized area in a settling tank to a collection zone. The pivoted plates are all interconnected to a common drive or pivot means so that all of the plates are simultaneously moved from one position to another by actuation of the drive means.

In this specific embodiment illustrated, each of the conduits is connected to an individual compartment and all of the compartments are aligned with each other. With this arrangement, a pivoted plate can be rotated between a pair of conduits for compartments leading from each localized zone and all of the pivoted plates are located in a flat plane. In the illustrated embodiment, the drive means includes a single shaft that is located above the pivot axes for the respective plates and the shaft is connected to each of the plates through a drive mechanism so that rotation of the shaft will simultaneously rotate all of the plates.

In a second embodiment, first conduits leading from each localized area are aligned with each other and second conduits are also aligned with each other. A valve element is movable with respect to each conduit and a first shaft is connected to the valve elements associated with the first conduits while a second shaft is connected to the valve elements associated with the second conduits so that the flow rate can be varied by rotation of either shaft. This embodiment is also designed for use with a single conduit leading from each localized area.

The drive means may take any number of forms such as a manual handwheel, a push button operated drive motor and may also be automatically actuated in response to the amount of influent flow received into the clarifier.

BRIEF DESCRIPTION OF THE SEVERAL VIEWS OF THE DRAWINGS

FIG. 1 show a fragmentary view of a clarifier having the present invention incorporated therein;

FIG. 2 is a fragmentary plan view of a portion of one of the rake arms of the clarifier shown in FIG. 1;

FIG. 3 is a horizontal sectional view, as viewed along line 3—3;

FIG. 4 is a vertical section as viewed along line 4—4 of FIG. 3;

DETAILED DESCRIPTION

Figure 5:
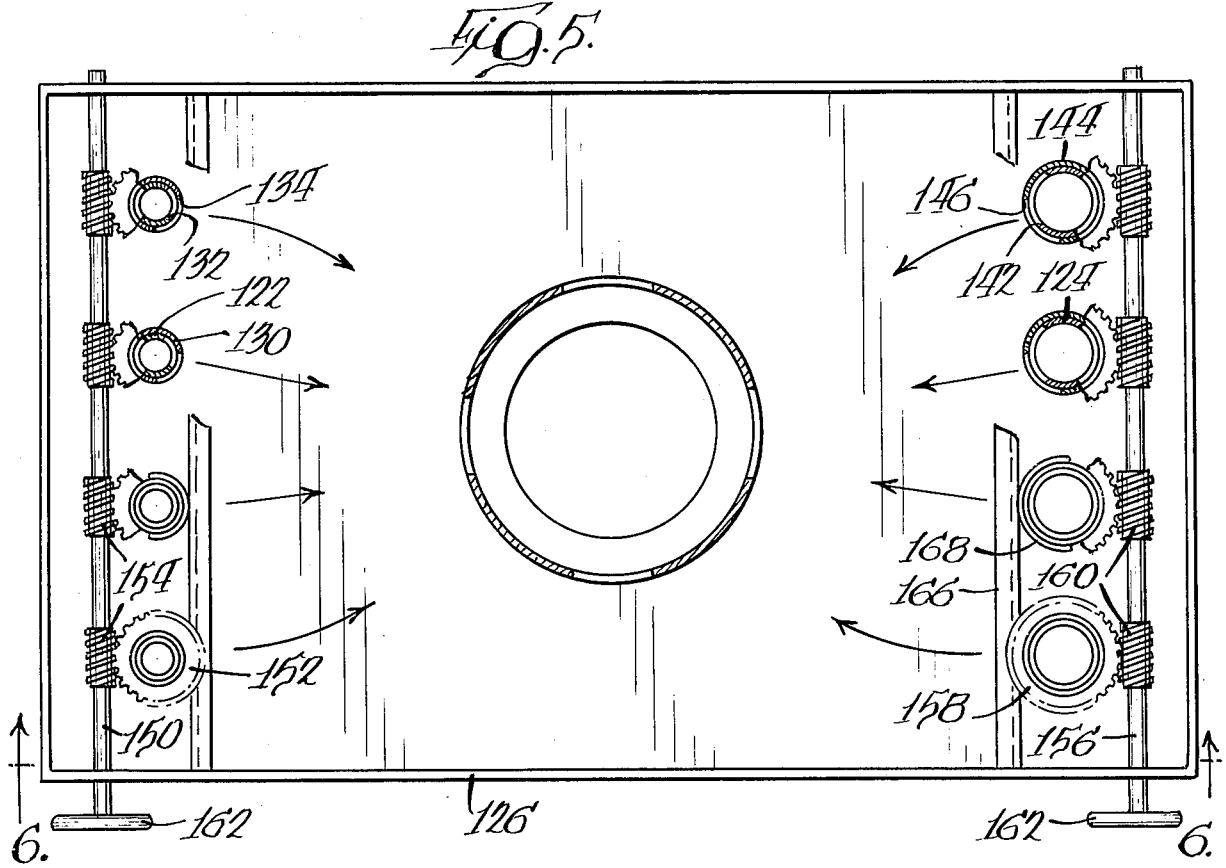
FIG. 5 is a view similar to FIG. 3 showing a modified arrangement for the conduits and flow control means.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

FIG. 1 of the drawings shows a sludge removal mechanism generally designated by the reference numeral 10 for withdrawing sludge that has settled to the bottom of the tank with the drawings illustrating only bottom wall 12 of the tank. In the specific illustrated embodiment, the tank is disclosed as being circular but it will be appreciated that the sludge withdrawal mechanism can readily be used in a rectangular tank as well.

Sludge removal mechanism 10 consists of a pair of rake arms 14 that are supported at their inner ends on a frame structure 16 that is rotated above the center of bottom wall 12. Each rake arm supports a plurality of blades 20 that are arranged to define substantially V-shaped plows 21 (FIG. 2) with the apexes of the V-shaped plows being located on the trailing side of the frame structure when considered in the direction of travel of the frame, indicated by the arrow in FIG. 2. The v-shaped plows act as concentrating means for concentrating settled sludge in localized areas on the bottom of the tank as the frame structure is being rotated.

A pair of first and second conduits 22 and 24 extend from the apexes of each V-shaped plow to a collection zone 26 which is located above the tank floor or bottom and rotates with frame structure 16. As illustrated in FIG. 4, each conduit 22, 24 has its upper end extending through bottom wall 28 of collection zone or rotating collection well 26 and is open at the top. Each of the conduits or withdrawal pipes 22, 24 telescopingly receives a valve 30 through the upper open end thereof. Valve 30 consists of a circular pipe that has an opening 32 in the wall thereof which opens into a rotating collection well 26. Valve 30 may have a handle 34 secured to the upper end thereof so that the valve may be raised and lowered within its associated tube 22, 24. Thus, raising and lowering of the valve will vary the vertical position of opening 32 with respect to collection zone 26 and thereby vary the flow rate through the associated conduit. Of course, it will be appreciated that other types of flow control elements could be used to vary the flow rate through each conduit.

The sludge that is withdrawn from the tank bottom and is delivered to the rotating collection well 26 flows through openings 38 in a stationary center column 40 and is then withdrawn through a further effluent conduit (not shown). The lower end of the center column has a further stationary column 42 surrounding it and the space between the two columns defines an influent passage 44 having a plurality of openings 46 so that the liquid being clarified is delivered to the bottom end of passage 44 through a conduit (not shown) and flows upwardly and out through openings 46.

The mechanism so far described is essentially the same as that disclosed in the above-mentioned U.S. Pat. No. 3,800,955.

According to one aspect of the present invention, the flow from each of the individual conduits or pipes 22, 24 is delivered into a separate compartment that is located in the collection well and the flow from each separate compartment is controlled by a flow control device associated with each conduit. More specifically, referring to FIG. 3, each pair of pipes 22, 24 is associated with a pair of rectangular compartments 50 and 52, respectively. Each compartment 50, 52 has an opening 54 in the inner wall thereof to place the closed compartment in communication with the center of collection well 26.

Each pair of adjacent compartments 50, 52 has a separate flow control device associated therewith. Referring again to FIG. 3, a flow control device or plate is pivoted about a fixed vertical pivot axis 62 which is located between an adjacent pair of compartments 50 and 52. Thus, with the plates 60 in the position illustrated in FIG. 3, all of the conduits 22, 24 will be in communication with rotating collection well 26 so that the hydraulic head differential between the liquid level in the tank and opening 32 in valve element 30 will produce a flow from the respective localized areas of the tank bottom through the respective conduits into collection well or zone 26.

As clearly illustrated in FIG. 3, all of the compartments 50, 52 associated with the conduits leading from one rake arm 14 are aligned in end to end relation with each other and each adjacent pair of compartments has a common wall. Thus, all of the respective pivot axes 62 will be located along a common flat plane adjacent the front walls of the respective compartments.

According to the primary aspect of the present invention, all of the flow control devices 60 are simultaneously moved from one position to another through a central drive mechanism that can readily be incorporated into the system at a minimum cost. According to FIG. 1, the drive mechanism or pivot means for pivoting the respective plates 60 between respective positions consists of a shaft 64 that extends across the aligned pivot axes 62 above collection zone 26. The shaft 64 may be supported for rotation about a fixed axis through any suitable means, such as brackets extending from collection zone 26. One end of shaft 64 has a handwheel 66 secured thereto so that shaft 64 can be rotated about its pivot axis by rotation of handwheel 66. Shaft 64 is connected to each of the plates 60 through a right angled gear box 70 (FIG. 4) and shaft means 72 which has a pair of connecting joints 74 associated therewith. The driving connection between shaft 64 and shaft means 72 may be in the form of bevel gears in housing 70.

Thus, with the system so far described, if handwheel 66 is rotated to pivot flow control plates 60 in a counterclockwise direction $\pi°$, the respective openings 54 associated with compartments 52 will be closed thereby limiting the flow to the smaller conduits 22. Likewise, rotating shaft 64 and pivot control plates 60 in a clockwise direction as viewed in FIG. 3 will close the openings 54 associated with compartments 50 so that flow from the tank bottom to the collection zone will be only through conduits 24. Summarizing, plates 60 have a first position wherein they block flow from the first conduits while accommodating flow from the second conduits to the collection zone and have a second position where the plates block flow from the second conduits while accommodating flgw from the first conduit to the collection zone. Plates 60 also have a third position (illlustrated in FIG. 3) which accommodates flow from both the first and second conduits leading from the respective localized areas to the collection zone. Of course, in any of the positions, the flow rate through any given individual conduit or pipe can be varied by repositioning valve 30.

As can be appreciated from the above description, the present arrangement substantially reduces the amount of time required for a plant operator to adjust the flow control devices for a given tank. For example, if all of the flow control plates for a given rake arm are aligned with each other as illustrated in FIG. 3, an operator can change the flow characteristics for the entire rake arm in a matter of seconds since moving from one extreme position to the other requires only a rotation or pivoting of plates 60 through an arc of 180°.

The remote control device described above has an additional advantage in that it may be automatically operated in response to predetermined conditions for a given treatment facility. For example, treatment facilities in many instances are to a large degree operated automatically. Such treatment facilities normally have some type of sensor that is located at the inlet to the entire facility and senses the influent flow rate into the entire facility. This sensor then operates many control elements in the entire system. In a complete treatment facility, there may be several liquid clarifiers required to handle the amount of fluid being delivered thereto.

Thus, according to another aspect of the invention, the movement of plates 60 from one position to another can be controlled as a function of the amount of influent that is being received into the system. FIG. 4 illustrates an automatic system wherein a sensor 80 is located in the influent passage 44 (the sensor would actually be located remote from tank 10) and is connected electrically or pneumatically through a line 82 to a drive mechanism such as a gear motor 84. With such a system, sensor 80 can be set to activate motor 84 at three given levels so that the plates 60 are automatically moved between the respective positions in response to the rate of flow in the influent passage.

Figure 6:
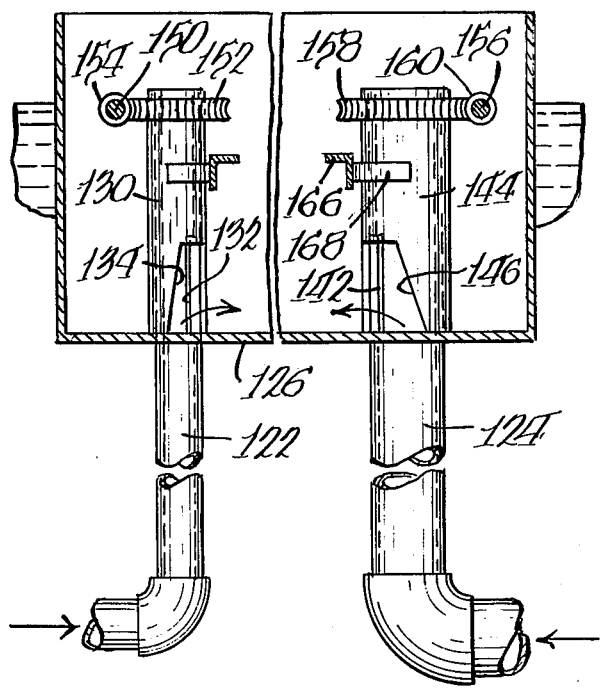
FIG. 6 is a fragmentary vertical section as viewed along line 6—6 of FIG. 5.

A slightly modified form of the invention is disclosed in FIGS. 5 and 6 and in many respects is similar to the embodiment disclosed and described above.

The embodiment of FIGS. 5 and 6 incorporates a collection zone 126 that is similar to the collection zone 26 described in connection with the above embodiment. However, in this embodiment, the smaller size conduits 122 respectively communicate with localized areas 21 of one rake arm 14 while the larger sized conduits 124 are associated with the localized areas of the second arm 14 (FIG. 1). In this embodiment, all of the conduits 122 terminate at their upper ends in a common plane located adjacent one side of the rectangular collection zone or well 126 and each conduit has a first valve 130 associated therewith. The respective valves are rotatably supported on the upper ends of conduits 122 and each of the conduits 122 has an opening 132 defined therein while each flow control device or valve element 130 has an opening 134 defined therein.

In a similar manner, conduits 124 also extend through the lower wall of collection zone 126 and have openings 142 defined therein within collection zone 126. Second valves or flow control devices 144 are associated with each of the conduits and have openings 146 defined therein.

In the embodiment illustrated in FIGS. 5 and 6, the respective flow control devices 130 and 144 are each rotatably rotated as a group by separate drive shafts that form the drive means for the flow control devices. As illustrated in FIGS. 5 and 6, a first shaft 150 is rotatably supported adjacent a first plane defined by first conduits 122 and is connected to each of the valve elements 130 through a worm gear element 152 secured to valve element 130 and a cooperating gear 154 secured to shaft 150. Likewise, a second shaft 156 is rotatably supported adjacent a second plane defined by second conduits 124 and is connected to the respective valve elements 144 through a worm gear 158 and a cooperating gear 160. The respective shafts may either be controlled manually through handwheels 162 or manually actuated drive motors (not shown in FIG. 5). The respective shafts may also be remotely controlled through sensors 80 such as disclosed in FIG. 4.

In order to support the control valve elements 130 and 144, it is perferable that a bracket 166 extend between opposite walls of collection zone 126 with a saddle support or cradle structure 168 extending from the respective brackets and surrounding at least a portion of each of the valve elements.

The advantage of the embodiment illustrated in FIGS. 5 and 6 is that more accurate control can be maintained for the flow from each of the first and second conduits that are respectively supported on the two rake arms 14 by appropriate rotation of the respective valve elements with their associated conduits to partially or fully open the openings 132 and 142 in the respective conduits.

Figure 7:
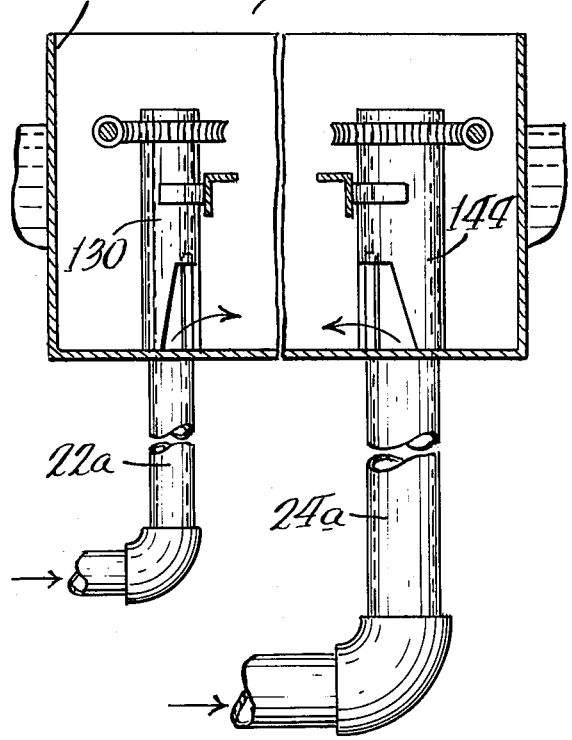
FIG. 7 is a view similar to FIG. 6 showing a further modified form of the invention.

FIG. 7 shows a further modified form of the invention wherein conduits 22a and 24a are both associated with each localized area 21 as shown in FIGS. 1 and 2. However, in this embodiment, the first set of conduits 22a are aligned with each other adjacent one side of collection zone 26a and the second set of conduits 24a are aligned with an opposite side of collection zone 26a. Valves such as 130 and 144 cooperate with the respective conduits to control flow through the respective conduits in a manner similar to that described in connection with FIGS. 5 and 6.

Thus, it can be appreciated that the present invention provides an extremely advantageous system that can readily be incorporated into a treatment facility to substantially reduce the amount of time required for an operator to vary the flow rate for an entire treatment facility and the automatic system provides remote automatic means for varying the return sludge flow based on process requirements.

Of course, any other types of flow control devices could be used in the respective embodiments and the only requirement for the flow control devices is that they be capable of being actuated simultaneously.

While the particular drive arrangement has been shown as consisting of a single shaft for all of the flow control devices associated with a single rake arm, it will readily be appreciated that the drive mechanism can also be designed so that a single drive shaft could be utilized for controlling the flow from all of the rake arms of the given tank. This would further reduce the time required for changing the flow rate within a given tank.

What is claimed is:

1. A sludge removal mechanism for withdrawing sludge that has settled to the bottom of a tank comprising a movable concentrating means for concentrating the settled sludge in a plurality of localized areas of the tank bottom, a collection zone located above the tank bottom for receiving settled sludge, a pair of conduits leading from each localized area to said collection zone, a movable plate in said collection zone for each of said pair of conduits and movable between positions to control flow from each localized area to said collection zone, and means for simultaneously moving all of said plates between positions so that flow from a plurality of localized areas is varied simultaneously.

2. A sludge removal mechanism as defined in claim 1, in which said collection zone has a single compartment for each conduit with each compartment having an opening for placing the compartments in communication with said collection zone and in which said plates are pivoted about a fixed pivot axis between adjacent pairs of compartments for each pair of conduits leading from a localized area so that each plate blocks flow from one conduit of each pair in a first position, blocks flow from a second conduit of each pair in a second position and accommodates flow from both conduits of each pair in a third position.

3. Sludge removal mechanism as defined in claim 2, in which said compartments are aligned with each other to locate all said axes in a common vertical plane and in which said last means includes a shaft located above said fixed pivot axes with connection means between said shaft and each plate and drive means for rotating said shaft to simultaneously pivot all said plates.

4. Sludge removal mechanism as defined in claim 1, in which said last means includes motor means for moving said plates.

5. Sludge removal mechanism as defined in claim 4, further including sensor means producing a signal as a function of influent flow to the tank, said sensor means actuating said motor means as a function of influent flow to the tank.

6. In a sludge removal mechanism for withdrawing sludge that has settled to the bottom of a settling tank and depositing the sludge in a collection zone located above the bottom of the tank, said mechanism including concentrating means for concentrating the settled sludge in a plurality of localized areas on the tank bottom and conduit means including at least first and second conduits leading from each localized zone to said collection zone, the improvement comprising a flow control device in said collection zone associated with each of said first and second conduits, and drive means connected to said flow control devices for simultaneously moving each of said devices with respect to an associated conduit and varying the flow from an associated localized area.

7. Sludge removal mechanism as defined in claim 6, in which said first and second conduits leading from a localized area are located adjacent each other and said flow control devices include a plate for each localized area pivoted between said first and second conduits and in which said drive means pivots said plates between first, second, and third positions, said first position of said plates accommodating flow from said first conduits while blocking flow from said second conduits, said second position of said plates blocking flow from said first conduits and accommodating flow from said second conduits and said third position of said plates accommodating flow from said first and second conduits to said collection zone.

8. Sludge removal mechanism as defined in claim 7, further including a pair of adjacent compartments for each collection zone with each conduit in communication with a single compartment and each compartment having an opening in communication with said collection zone, and in which said plates are pivoted about said fixed pivot axes extending vertically between each of said pair of adjacent compartments so that said plates block flow through respective openings in said first and second positions and accommodate flow through both openings in said third position.

9. Sludge removal mechanism as defined in claim 8, in which said drive means includes a shaft rotatable about an axis perpendicular to said fixed pivot axes with connection means between each plate and said shaft so that said plates are simultaneously pivoted in response to rotation of said shaft.

10. Sludge removal mechanism as defined in claim 8, in which each conduit is in communication with a bottom of a compartment further including a valve movable with respect to each conduit and adjustable to vary the flow rate from the associated conduit.

11. Sludge removal mechanism as defined in claim 6, in which said flow control devices include a valve element in said collection zone and rotatable with respect to an associated conduit.

12. Sludge removal mechanism as defined in claim 11, in which said first conduits are aligned in a first plane and said second conduits are aligned in a second plane; and in which said drive means includes a first shaft connected to said valve elements of said first conduits and a second shaft connected to said valve elements of said second conduits, and means for rotating said shafts.

13. A sludge removal mechanism for withdrawing sludge that has settled to the bottom of a settling tank and depositing said sludge in a collection zone located above the bottom of the tank, said mechanism including concentrating means for concentrating settled sludge in a plurality of localized areas on the tank bottom, at least a first conduit leading from some of said localized areas to said collection zone, a first valve element associated with each of said first conduits in said collection zone, drive means for simultaneously moving said first valve elements with respect to said conduits to vary the flow through each of said first conduits, a second conduit leading from the remainder of said localized areas to said collection zone, second valve elements associated with each of said second conduits, and further drive means for simultaneously moving said second valve elements to vary the flow through said conduits.

14. A sludge removal mechanism as defined in claim 13, in which said first conduits are aligned in a first plane and said second conduits are aligned in a second plane, and in which said drive means includes a first shaft adjacent said first plane and connected to each first valve element for simultaneously rotating said first valve elements with respect to said first conduits and said further drive means includes a second shaft adjacent said second plane and connected to each of said second valve elements for simultaneously rotating said second valve elements with respect to said second conduits.

15. A sludge removal mechanism as defined in claim 13, in which said concentrating means includes first and second spaced rake arms each defining a plurality of localized areas with said first conduits leading from said localized areas on said first rake arm and said second conduits leading from said localized areas of said second rake arm to said collection zone.

* * * * *